Jan. 20, 1970     T. M. GABRIEL ET AL     3,491,270
NON-POLAR SOLID ELECTROLYTE TANTALUM CAPACITOR
Filed Sept. 7, 1967
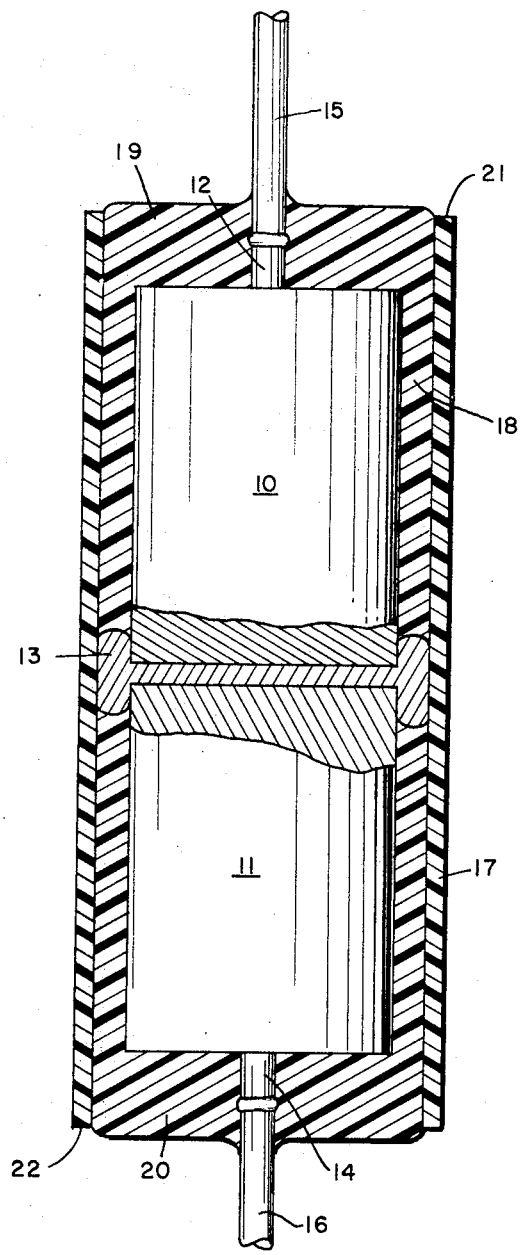
INVENTORS
THOMAS M. GABRIEL
CHARLES G. STURGILL
ATTORNEY

United States Patent Office 3,491,270
Patented Jan. 20, 1970

3,491,270
NON-POLAR SOLID ELECTROLYTE TANTALUM CAPACITOR
Thomas M. Gabriel and Charles G. Sturgill, Indianapolis, Ind., assignors to P. R. Mallory & Co., Inc., Indianapolis, Ind., a corporation of Delaware
Filed Sept. 7, 1967, Ser. No. 666,197
Int. Cl. H01g 9/00
U.S. Cl. 317—230  6 Claims

ABSTRACT OF THE DISCLOSURE

Two solid tantalum capacitor bodies are held in tandem with solder between the two, the bodies encapsulated in an epoxy filled plastic case.

---

Solid electrolyte tantalum capacitors are being employed instead of commonly used aluminum capacitors for many applications because of several advantages which tantalum capacitors have over those of aluminum. One is the size advantage. Tantalum units having a given capacitance times voltage rating can be manufactured and packaged so as to be smaller than aluminum electrolytic capacitors having the same rating. Thus miniature, single case tantalum capacitors find many uses in various types of electronic circuits.

There are many applications where such capacitors need to be non-polar in their construction or arrangement. For example, non-polar applications are found in alternating current systems, for example, as a filter across the output terminals of a power supply. In such applications, the capacitors are so constructed and arranged that either lead of the capacitor can be made positive or negative according to the circuit connections.

Generally speaking, non-polar capacitors are formed by holding two capacitor bodies in tandem with their cathode ends being electrically connected. The present state of the art accomplishes this by connecting two encapsulated bodies end to end with a soldered or welded connection. In effect, the non-polar arrangement is accomplished by electrically connecting the cathode ends of two separate capacitors usually by soldering or welding. This leads to a bulky arrangement.

The present invention is concerned with non-polar solid tantalum capacitors and has as one of its objects the provision of such a capacitor which is encapsulated as a single unit.

Another object of the invention is the provision of such a capacitor wherein two processed anodes forming capacitor bodies are placed in tandem within an encapsulating means.

Another object of the invention is to provide such a capacitor wherein the processed anodes that are placed in tandem are electrically connected through solder.

Still another object of the invention is to provide a method of fabricating a non-polar capacitor encapsulated as a single unit.

Another object of the invention is to provide a method of fabricating a non-polar capacitor encapsulated as a single unit which is economical and which provides for ease of assembly of the unit.

Yet another object of the invention is to provide an epoxy filled, non-polar, solid electrolyte capacitor encapsulated as a single unit.

With the above and other objects in view which will appear as the description proceeds, this invention resides in a method for manufacturing a miniature, solid electrolyte tantalum capacitor and the capacitor produced thereby, substantially as described herein and more particularly defined by the appended claims, it being understood that such changes in the precise embodiment of the invention here disclosed may be made as come within the scope of the claims.

In the drawings, the sole figure is a cross section of the non-polar capacitor of the present invention showing its novel features with a portion of the capacitor bodies being removed.

Generally speaking, the objects of the invention are accomplished by providing a non-polar solid tantalum capacitor which in general comprises a pair of solid tantalum capacitor bodies disposed in tandem relationship joined by a cathodic connecting means and having electrical terminals or leads extending from their opposite ends, a sleeve surrounding the bodies, and an epoxy resin disposed between the sleeve and the bodies and substantially covering the lead ends of the bodies to form a single, encapsulated, non-polar unit.

The novel non-polar capacitor and its method of manufacture can be described in greater detail with reference to the drawing. Referring to the drawing, a pair of capacitor bodies 10 and 11 are held in tandem relationship with a soldered joint 13 connecting the two. The term capacitor body is here meant to include a pressed and sintered porous anode that has been anodized to a preselected voltage, and having cathodic connecting elements including a dielectric film, a semiconductor film such as manganese dioxide, a graphite film to lower the electrical resistance of the system, and an outer conductive silver paint layer. Also included as part of the processed tantalum anode are tantalum risers 12 and 14 formed on the opposite ends of the body to which leads 15 and 16 can be welded. The capacitor bodies are centrally disposed within a sleeve 17, the bodies being held in alignment with the aid of the soldered joint 13. An epoxy resin 18 is disposed between the bodies and the sleeve and at the ends of the bodies 19 and 20, there being a sufficient amount of such epoxy to substantially fill the sleeve out to the ends 21 and 22 so as to thus encapsulate the bodies as a single unit.

The epoxy resin is preferably of the filled epoxy resin type, and which is room temperature curing and of low viscosity. Such a material minimizes voids in the system to aid in yielding a compact unit.

In addition to providing a non-polar capacitor that is made as a single unit, the present invention, by using an epoxy to encapsulate the bodies, provides for increased packaged volumetric efficiency; that is, maximum utilization of the capacitor's volume in the ultimate package. This is extremely important in small miniature capacitors such as these where their size ranges in lengths of from about .25 inch to .5 inch, and their diameters from about .076 inch to .14 inch. Prior art capacitors, for the most part, utilized a separate end closure plate or disc which had to be connected to the sleeve 17. This not only lowered the volumetric efficiency but it led to fabrication difficulties.

Sleeve 17 is fabricated from a thermosetting polyester material such as Mylar.

The preferred method of fabricating the non-polar capacitor is to first place sleeve 17 in a suitable holding fixture. Next the processed capacitor body 11 is placed in the fixture within the sleeve such that the riser 14 with the lead 16 welded to it is pointed downward. Next solid solder is placed on the inserted body. A sufficient amount of solder is used to allow the soldered joint to extend to the sleeve wall. Next, body 10 is placed in the fixture on the solder and the whole assembly is heated sufficiently to form the soldered joint 13. Preferably the heat is applied through resistance heating, the solder being heated by conduction through the sleeve.

The assembled non-polar capacitor along with the fixture is allowed to cool to below the melting point of the solder. When the cooling cycle is completed, the assembly is removed from the fixture, and the epoxy resin 18 is poured into the sleeve from both ends one at a time and cured in turn. The epoxy is cured at room temperature.

Thus there is described a novel non-polar capacitor and method of making it, the novel features of which should be readily apparent to those skilled in the art. In addition, the present invention is not intended to be limited to the disclosure herein, and changes and modifications may be made in the disclosure by those skilled in the art without departing from the spirit and scope thereof. Such modifications and variations are considered within the purview and scope of this invention and the appended claims.

What is claimed is:

1. A solid electrolytic non-polar capacitor comprising: at least two porous sintered anode bodies with each including a continuous dielectric oxide film on the surface thereof and a terminal lead extending therefrom; a respective solid electrolyte layer overlying each dielectric film; an electrically conductive cathode layer on each electrolyte layer, a sleeve and said bodies being disposed in tandum in the sleeve with said terminal leads respectively extending at opposite ends thereof; means within said sleeve for electrically interconnecting said cathode layers and a mass of electrically insulating material covering said bodies and filling the space between the bodies and the sleeve and sealing the ends of the sleeve around said respective terminal leads.

2. In a non-polar capacitor according to claim 1 in which said sleeve is fabricated from a thermosetting polyester plastic.

3. In a non-polar capacitor according to claim 1 in which said electrically insulating material epoxy resin is of the filled epoxy resin type, is room temperature curing, and of low viscosity.

4. In a non-polar solid, tantalum capacitor having two capacitor bodies each including pressed and sintered tantalum anodes that have been anodized to a preselected voltage and further having cathodic connecting elements including a dielectric film, a semiconductor film, a film to lower said bodies electrical resistance, and an outer conductive layer; a thermosetting polyester plastic sleeve, said bodies being disposed in tandem relationship within said sleeve and being connected by a soldered joint extending from between said bodies to said sleeve, electrical leads extending from said bodies at their opposite ends, and a filled, low viscosity, cured epoxy resin disposed between said sleeve and said bodies and substantially covering the lead ends of said bodies to form a single, encapsulated, non-polar capacitor.

5. A method of forming a single, encapsulated non-polar, solid electrolyte capacitor which comprises, inserting a preformed solid electrolyte capacitor body having an electrical lead extending from one end thereof into a sleeve such that said electrical lead extends beyond one end of the sleeve, inserting a second performed capacitor body having an electrical lead extending from one end thereof into said sleeve and in electrical contact with said first body such that said electrical lead of said second body extends beyond the opposite end of said sleeve, and thereafter filling the space between said bodies and said sleeve and the space at the lead ends of said bodies with a thermoplastic material to substantially fill said sleeve.

6. A method of forming a single encapsulated non-polar, solid tantalum electrolyte capacitor which comprises, inserting a preformed solid tantalum capacitor body having an electrical lead extending from one end thereof into a sleeve such that said electrical lead extends beyond one end of the sleeve, placing a sufficient amount of a solder on the opposite end of said body to form a soldered joint between said body and a second body and to force said solder to extend to said sleeve, inserting a second preformed solid tantalum capacitor body having an electrical lead extending from one end thereof into said sleeve into said first body and said pellet such that said electrical lead of said second body extends beyond the opposite end of said sleeve, heating said solder by the application of heating through said sleeve so as to melt said solder to form a soldered joint between said bodies and said sleeve, cooling said joint, and thereafter filling the space between said bodies and the space at the lead ends of said bodies with an epoxy resin to substantially fill said sleeve with said epoxy, and curing said epoxy.

References Cited

UNITED STATES PATENTS

| | | | |
|---|---|---|---|
| 2,299,667 | 10/1942 | Waterman | 317—230 |
| 3,066,247 | 11/1962 | Robinson | 317—230 |
| 3,115,596 | 12/1963 | Fritsch | 317—230 |
| 3,196,323 | 7/1965 | Rogers et al. | 317—230 |
| 3,206,658 | 9/1965 | Markarian | 317—230 |

JAMES D. KALLAM, Primary Examiner

U.S. Cl. X.R.

29—570; 264—272